United States Patent Office 3,784,590
Patented Jan. 8, 1974

3,784,590
HYDROXY AND IMINO CONTAINING
PHOSPHONIC ACID DIESTERS
Raymond A. Firestone, Fanwood, N.J., assignor to
Merck & Co., Inc., Rahway, N.J.
No Drawing. Original application Jan. 2, 1969, Ser. No.
789,060, now Patent No. 3,637,763. Divided and this
application Apr. 13, 1971, Ser. No. 133,730
Int. Cl. A01n 9/36; C07f 9/48
U.S. Cl. 260—944     5 Claim

ABSTRACT OF THE DISCLOSURE

This invention relates to [1-hydroxy-2-methyl-3-(substituted-imino)pentyl]phosphonic acid diesters and [1-(1-hydroxyethyl)-2-(substituted-imino)]phosphonic acid diesters which have utility as intermediates in the preparation of (cis-1,2-epoxypropyl)-phosphonic acid. The acid product thus obtained and its salts are antimicrobial agents which are useful in inhibiting the growth of gram-positive and gram-negative pathogenic bacteria.

This application is a divisional of applicant's co-pending application Ser. No. 789,060, filed Jan. 2, 1969 which issued as U.S. Pat. No. 3,637,763 on Jan. 25, 1972.

DESCRIPTION OF THE PREFERRED
EMBODIMENTS

The diesters of (cis-1,2-epoxypropyl)-phosphonic acid can be prepared by a process which may be depicted as follows:

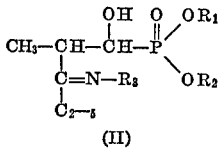

(II)

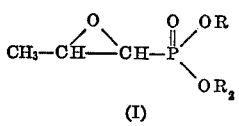

(I)

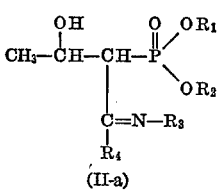

(II-a)

where $R_1$ and $R_2$ are the same or different lower alkyl such as methyl, ethyl, propyl, tertiary butyl and butyl, aryl such as phenyl, or substituted aryl such as halophenyl, loweralkoxy phenyl such as methoxyphenyl and ethoxyphenyl, tolyl, aralkyl such as benzyl, substituted aralkyl such as halobenzyl, nitrobenzyl, hydroxybenzyl, loweralkoxybenzyl such as methoxy and ethoxy benzyl, loweralkynyl such as propargyl, and loweralkenyl such as allyl and methallyl; $R_3$ is a good leaving group such as a tosyl-oxy, brosyloxy, mesyloxy, trifluoroacetoxy or a 2,4-dinitrophenoxy group; and $R_4$ is loweralkyl such as methyl, ethyl, propyl and butyl, aryl such as phenyl, substituted aryl such as halophenyl, nitrophenyl, and tolyl, aralkyl such as benzyl, and substituted aralkyl such as halobenzyl and nitrobenzyl, loweralkoxybenzyl such as methoxybenzyl and ethoxybenzyl, heteroaryl containing 1–3 hetero atoms wherein each of the hetero atoms is sulfur, oxygen or nitrogen, such as pyrrolyl, pyrryl, piperidyl, thiazolyl, furyl, and pyrazinyl.

The compounds of Formulae II and II-a are novel compounds. Some examples of the novel compounds of Formula II are dimethyl-[1-hydroxy-2-methyl-3-(tosyloxyimino)-
  pentyl]-phosphonate,
dipropyl-[1-hydroxy-2-methyl-3-(brosyloxyimino)-
  pentyl]-phosphonate,
di-t-butyl-[1-hydroxy-2-methyl-3-(tosyloxyimino)-
  pentyl]-phosphonate,
diphenyl-[1-hydroxy-2-methyl-3-(brosyloxyimino)-
  pentyl]-phosphonate,
dibenzyl-[1-hydroxy-2-methyl-3-(brosyloxyimino)-
  pentyl]-phosphonate,
di-p-methoxybenzyl-[1-hydroxy-2-methyl-3-(tosyloxy-
  imino)-pentyl]-phosphonate,
dipropargyl-[1-hydroxy-2-methyl-3-(mesyloxyimino)-
  pentyl]-phosphonate,
dimethallyl-[1-hydroxy-2-methyl-3-(mesyloxyimino)-
  pentyl]-phosphonate,
di-p-chlorophenyl-1-[1-hydroxy-2-methyl-3-tosyloxy-
  imino)-pentyl]-phosphonate,
di-p-methoxyphenyl-[1-hydroxy-2-methyl-3-(brosyloxy-
  imino)-pentyl]-phosphonate,
dimethyl-[1-hydroxy-2-methyl-3-(trifluoroacetoxyimino)-
  pentyl]-phosphonate,
dipropyl-[1-hydroxy-2-methyl-3-(2,4-dinitrophenoxy-
  imino)-pentyl]-phosphonate, and
dibenzyl-[1-hydroxy-2-methyl-3-(tri-fluoroacetoxy-
  imino)-pentyl]-phosphonate.

Some examples of the novel compounds of Formula II-a are dimethyl-[1-(1-hydroxyethyl)-2-(tosyloxyimino)-propyl]-
  phosphonate,
dipropyl-[1-(1-hydroxyethyl)-2-(brosyloxyimino)-
  butyl]-phosphonate,
di-t-butyl-[1-(1-hydroxyethyl)-2-(mesyloxyimino)-
  pentyl]-phosphonate,
diphenyl-[1-(1-hydroxyethyl)-2-(tosyloxyimino)-
  propyl]-phosphonate,
diphenyl-[1-(1-hydroxyethyl)-2-(brosyloxyimino-3-
  phenyl)-propyl]-phosphonate,
di-p-methoxybenzyl-[1-(1-hydroxyethyl)-2-(mesyloxy-
  imino-4-phenyl)-butyl]-phosphonate,
dipropargyl-[1-(1-hydroxyethyl)-2-(brosyloxyimino)-
  propyl]-phosphonate,
dimethallyl-[1-(1-hydroxyethyl)-2-(tosyloxyimino)-
  butyl]-phosphonate,
di-p-chlorophenyl-[1-(1-hydroxyethyl)-2-(brosyloxy-
  imino)-pentyl]-phosphonate,
dibenzyl-[1-(1-hydroxyethyl)-2-(brosyloxyimino-3-
  thiazolyl)-propyl]-phosphonate,
dimethyl-[1-(1-hydroxyethyl-2-(mesyloxyimino-3-pyrryl)-
  propyl]-phosphonate, di-t-butyl-[1-(1-hydroxyethyl)-2-(tosyloxyimino-3-pyrazinyl)-propyl]-phosphonate, dibenzyl-[1-(1-hydroxyethyl)-2-(trifluoracetoxyimino)-propyl]-phosphonate, dipropyl-[1-(1-hydroxyethyl)-2-(2,4-dinitrophenoxyimino)-propyl]-phosphonate, and dipropargyl-[1-(1-hydroxyethyl)-2-(trifluoroacetoxyimino)-3-phenyl)-propyl]-phosphonate.

As can be seen from the above reaction scheme, a (cis-1,2-epoxypropyl)-phosphonic acid diester such as, for example, dimethyl-(cis-1,2-epoxypropyl)phosphonate can be prepared from an α-hydroxy-β-substituted alkyl phosphonate such as, for example, dimethyl-[1 - hydroxy - 2-methyl-3-(tosyloxyimino)-pentyl]-phosphonate by cyclizing an α-hydroxy-β-substituted alkyl phosphonate in the presence of base in a suitable solvent. Inorganic bases such as sodium bicarbonate and sodium acetate may be employed for the cyclization as well as organic bases such as triethylamine and pyridine. Where the reaction proceeds under solvolytic conditions, suitable solvents for the cyclization are alcohols such as ethanol, propanol, and butanol, as well as mixtures of alcohol and water such as, for example, 80% ethanol. Where the reaction proceeds under non-solvolytic conditions, bases such as sodium hydride, may be employed to effect the cyclization. Where such bases are used to effect cyclization inert nonhydroxylic solvents such as benzene, xylene, and dimethylformamide may be employed. Generally, at least one equivalent of the base is employed in the reaction, and the reaction mixture is generally heated at about 30°–60° C. for about 1–5 hours, the reaction may also be carried out, however, at temperatures ranging from about 0° C. to about 80° C. A slight excess of the base may also be employed however. Longer heating periods may be employed to ensure complete reaction. The (cis-1,2-epoxypropyl)-phosphonic acid diester can then be recovered from the reaction mixture by methods known in the art. Generally, the solvent is removed in vacuo at about room temperature, and the residue is taken up into some suitable solvent such as either or methylene chloride. The diester is obtained upon removal of the solvent and can be purified by distillation in vacuo, or by other techniques known in the art. In like manner, the (cis - 1,2 - epoxypropyl)-phosphonic acid diesters can be prepared from a compound of Formula II–a such as, for example, dimethyl-[1 - (1 - hydroxyethyl) - 2 - (tosyloxyimino)propyl]-phosphonate.

Cis - 1,2 - epoxypropyl) - phosphonic acid has two optically active centers at carbons 1 and 2. Although the biologically active isomer is the cis compound, which is levorotatory, the (±) cis-mixture which is normally obtained where the starting material is a (±) cis-α-hydroxy-β-substituted phosphonate or a (±) α-substituted β-hydroxy phosphonate, is also biologically active.

In order to obtain (cis-1,2-epoxypropyl)-phosphonic acid and its salts, the ester groups must be cleaved from the cyclized diester. The ester groups can be cleaved by acid or acid-base hydrolysis. In the case of esters such as the benzyl esters and the loweralkenyl esters, cleavage to the free acid can be accomplished by catalytic hydrogenation. Where the starting material is racemic, the cyclization step will yield a racemic mixture of the (cis-1,2-epoxypropyl)-phosphonic acid compound. (—)(cis - 1,2-epoxypropyl)-phosphonic acid and its salts can be obtained from the racemic mixture by resolving the racemate with a suitable resolving agent such as, for example, quinine, or (+) or (—) α-phenethylamine.

As can be seen from the above reaction scheme, the novel starting materials II and II-a are isomeric to the extent that the group eliminated from the propyl chain may be substituted at either the α- or β-position of the aliphatic carbon chain. In Formula II–a, however, the leaving group may include, in addition to the ethyl group, as in Formula II, a loweralkyl, aryl, aralkyl, loweralkoxy aryl, or loweralkoxy aralkyl radical, depending upon the reactants employed to prepare the starting materials.

Compounds II can be prepared by a series of reactions which may be depicted as follows:

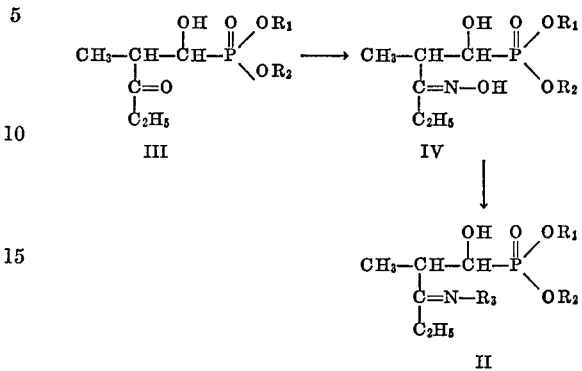

wherein $R_1$, $R_2$ and $R_3$ are as previously defined.

A (1-hydroxy - 2 - methyl-3-oxopentyl) phosphonate diester is reacted with hydroxylamine hydrochloride in a suitable solvent such as ethanol in the presence of a base, such as, for example, sodium hydroxide. The oxime is obtained by removal of the solvent, or by other techniques known in the art. To obtain Compound II, the oxime is reacted with p-toluene-sulfonyl chloride where $R_3$ is tosyloxy p-bromobenzensulfonyl chloride where $R_3$ is brosyloxy or with methanesulfonyl chloride where $R_3$ is mesyloxy. The oxime is first heated with a base such as sodium hydride in a suitable solvent such as benzene. The solution is cooled to about —5° to 10° C., and the acid halide is added dropwise. Compound II is removed from the reaction mixture upon removal of the solvent. The compounds where $R_3$ is trifluoroacetoxy are prepared by reacting the oxime with trifluoroacetic anhydride. The compounds where $R_3$ is 2,4-dinitrophenoxy are prepared by reacting the oxime with 2,4-dinitrochlorobenzene.

The (1-hydroxy-2-methyl - 3 - oxopentyl)phosphonate diesters are prepared by reacting 3-pentanone with an amine such as, for example, cyclohexylamine in a suitable solvent such as benzene. The resulting compound, for example, N-(3-pentylidene cyclohexylamine, is obtained by fractional distillation. The N-(3-pentylidene) amino compound is then reacted with a lithium dialkyl amide to form 3- oxo-2-pentyllithium and the latter compound upon reaction with an alkyl formylphosphonate, such as dimethyl formylphosphonate, for example, will yield a (1 - hydroxy-2-methyl-3-oxopentyl)phosphonate diester. The dialkyl formylphosphonates can be prepared by reacting a phosphite such as diethyl phosphite or dimethyl phosphite with an alkali metal, such as sodium; the resulting alkali metal salt thus formed is then reacted with formic acetic anhydride to obtain the corresponding dialkyl formylphosphonate.

Compounds II–a are prepared from a [1-(1-hydroxyethyl)ketonyl] phosphonate diester in a similar manner. The [1-(1-hydroxyethyl) ketonyl]phosphonate diester is prepared by first reacting a (2-oxoalkyl) phosphonate diester, such as dimethyl (2-oxopropyl) phosphonate with an amine such as ethylamine or cyclohexylamine to form, for example a [2-(cyclohexylimino)propyl] phosphonate diester. The latter compound is then reacted with a lithium dialkyl amide, such as lithium diethyl amide, to form, for example a (1-dialkoxyphosphinyl)-2-(cyclohexylimino)propyl lithium compound. The [1-(1-hydroxyethyl) ketonyl] phosphonate diester is then obtained by reacting, for example, a 1-dialkoxy-phosphinyl)-2-cyclohexylimine) propyl lithium compound with acetaldehyde.

(±) and (—) (cis-1,2-epoxypropyl)-phosphonic acid and its salts are useful antimicrobial agents, which are active in inhibiting the growth of both gram-positive and gram-negative pathogenic bacteria. The (—) acid and its salts, in particular, are active against Bacillus, Escherichia, Staphylococci, Salmonella, and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus,* and *Staphylococcus pyogenes.* Thus, (±) and (—) (cis-1,2-epoxypropyl)-phosphonic acid and salts thereof can be used as antiseptic agents to remove susceptible organisms from pharmaceutical, dental, and medical equipment and other areas subject to infection by such organisms. Similarly, they can be used to separate certain microorganisms from mixtures of microorganisms. Salts of (—) (cis-1,2-epoxypropyl)-phosphonic acid such as the sodium and calcium salts are also useful in the treatment of diseases caused by bacterial infections in man and animals and are particularly valuable in this respect, since they are active against resistant strains of pathogens. These salts are especially valuable, since they are effective when given orally, although they can also be administered parenterally. The salts of (±) (cis-1,2-epoxypropyl)-phosphonic acid are useful as preservatives in industrial applications since they effectively inhibit undesirable bacterial growth in the white water used in paper mills and in paints, e.g., in polyvinyl acetate latex paint.

The following examples are given for purposes of illustration and not by way of limitation:

Example 1.—Dimethyl-(cis-1,2-epoxypropyl)-phosphonate

Dimethyl-[1-hydroxy-2-methyl - 3 - (tosyloxyimino)-pentyl]-phosphonate (4 mmoles) is heated for 4 hours at 40° C. with 4 mmoles of sodium bicarbonate in 40 ml. of 80% ethanol with stirring. At the end of the reaction period, the solvent is removed in vacuo at 25° C., and the residue is taken up into 100 ml. of dry ether. The ether solution is dried with potassium carbonate and filtered. Upon evaporation of the solvent, dimethyl-(cis-1,2-epoxypropyl)-phosphonate is obtained as a liquid residue.

When in the above procedure diphenyl-[1-hydroxy-2-methyl - 3 - (brosyloxyimino)-pentyl]-phosphonate, dibenzyl-[1-hydroxy-2-methyl-3-(mesyloxyimino) - pentyl]-phosphonate, and dipropargyl-[1-hydroxy-2-methyl-3-(mesyloxyimino)-propyl]-phosphonate are employed in place of dimethyl-[1-hydroxy-2-methyl - 3 - (tosyloxyimino)-pentyl]-phosphonate, there are obtained diphenyl-(cis - 1,2 - epoxypropyl)-phosphonate, dibenzyl-(cis-1,2-epoxypropyl)-phosphonate, and dipropargyl - (cis - 1,2-epoxypropyl)-phosphonate, respectively.

When in the above procedure diethyl-[1-(1-hydroxyethyl)-2-tosyloxyimino)-pentyl]-phosphonate, dibutyl-[1-(1-hydroxyethyl) - 2 - mesyloxyimino)-propyl]-phosphonate, and diallyl-[1-(1-hydroxyethyl)-2-brosyloxyimino)-butyl]-phosphonate are employed in place of dimethyl-[1-hydroxy - 2 - methyl-3-(tosyloxyimino)-pentyl]-phosphonate, there are obtained diethyl-(cis-1,2-epoxypropyl)-phosphonate, dibutyl-(cis-1,2-epoxypropyl)-phosphonate, and diallyl-(cis-1,2-epoxypropyl) - phosphonate respectively.

Example 2.—Disodium (±) (cis-1,2-epoxypropyl)-phosphonic acid

A solution of 50 millimoles of diphenyl (±) (cis-1,2-epoxypropyl)phosphonate in 10 ml. of 30% ethanol water is refluxed with a two-fold excess of barium hydroxide in a nitrogen atmosphere for 1½ hours. The reaction is cooled, adjusted to pH 8 with 4 N sulfuric acid and extracted 3 times with ethyl acetate. The remaining aqueous slurry is stirred overnight at room temperature with 30 g. of sodium sulfate. The solids are removed by filtration and the filtrate evaporated to dryness to give (±) (cis-1,2-epoxypropyl)phosphonic acid, disodium salt.

The following examples illustrate a method for preparing the starting materials employed in the preparation of the (cis-1,2-epoxypropyl)phosphonic acid diesters.

(A) Dimethylformylphosphonate.—Dimethylphosphite (40.0 grams) and sodium (7.4 grams) are placed in 200 ml. of dry ether. To the resulting mixture is added with stirring and cooling one equivalent of formic acetic anhydride. The sodium acetate is removed by filtration, and ether is removed by evaporation. Upon vacuum distillation of the residue, dimethylformylphosphonate is obtained.

When in the above procedure diethylphosphite, dibutylphosphite and diphenylphosphite are employed in place of dimethylphosphite, there are obtained diethylformylphosphonate, dibutylformylphosphonate, and diphenylformylphosphonate, respectively.

(B) Dimethyl-[1-(1-hydroxyethyl) - 2 - oxopropyl]-phosphonate.—Dimethyl-(2-oxopropyl) - phosphonate (1 mole), cyclohexylamine (1 mole), and p-toluenesulfonic acid (0.1 mole) are refluxed in 75 ml. of benzene in a Dean-Stark apparatus until no additional water is evolved. The benzene solution is then cooled, washed with aqueous sodium bicarbonate, and dried with sodium sulfate. Upon fractional distillation of the residue, dimethyl-[2-(cyclohexylimino)-propyl]-phosphonate is obtained. The latter compound (25 mmoles) is then dissolved in 20 ml. of ether, and the resulting solution is added to lithium diiso-propylamide (25 mmoles) in 50 ml. of ether at 0° C. The reaction solution is then aged at 0° C. for 10 minutes. The solution is then cooled to —70° C. and to this is added dropwise with stirring a solution of acetaldehyde (25 mmoles) in 250 ml. of ether over 2 hours. The mixture is then aged for 24 hours at room temperature, cooled to 0° C., and then decomposed with ice water. The ether layer is separated and washed first with dilute aqueous phosphoric acid, then with dilute aqueous sodium bicarbonate, and is dried with sodium sulfate. Upon evaporation of the solvent, dimethyl-[1-(1-hydroxyethyl)-2-oxopropyl]-phosphonate is obtained.

When in the above procedure dipropyl-(2-oxopropyl)-phosphonate, diphenyl-(2-oxopropyl)-phosphonate, and di-t-butyl-(2-oxopropyl)-phosphonate are employed in place of dimethyl-(2-oxopropyl)-phosphonate, there are obtained dipropyl-[1-(1-hydroxyethyl) - 2 - oxopropyl]-phosphonate, diphenyl-[1-(1-hydroxyethyl) - 2 - oxopropyl]-phosphonate, and di-t-butyl-[1-(1-hydroxyethyl)-2-oxopropyl]-phosphonate, respectively.

(C) Dimethyl-(1-hydroxy - 3-hydroxyimino-2-methylpentyl)-phosphonate.—Dimethyl - (1-hydroxy-2-methyl-3-oxopentyl)-phosphonate (25 mmoles), hydroxylamine hydrochloride (0.25 mole), sodium hydroxide (0.25 mole), 140 ml. of water, and 10 ml. of ethanol are heated together with stirring at 60°–80° C. for several hours. The solvent is removed in vacuo, and the crystalline residue is recrystallized from benzene-petroleum ether to yield dimethyl-(1-hydroxy-3-hydroxy - 2 - methylpentyl)-phosphonate.

When in the above procedure dibenzyl-(1-hydroxy-2-methyl - 3-oxopentyl)-phosphonate, dipropyl-(1-hydroxy-2-methyl - 3 - oxopentyl)-phosphonate, and di-t-butyl-(1-hydroxy - 2 - methyl-3-oxopentyl)-phosphonate are employed in place of dimethyl - (1-hydroxy-2-methyl-3-oxopentyl)-phosphonate, there are obtained dibenzyl-(1-hydroxy-3-hydroxyimino - 2 - methylphentyl)-phosphonate, dipropyl-(1-hydroxy - 3 - hydroxyimino-2-methylpentyl)phosphonate and di-t-butyl (1-hydroxy-3-hydroxyimino-2-methylpentyl)phosphonate, respectively.

(D) Dimethyl - (1 - hydroxy-2-methyl-3-oxopentyl)-phosphonate.—Cyclohexylamine (25 mmoles), 3-pentanone (25 mmoles) and p-toluene sulfonic acid (0.25 mmole) are dissolved in 75 ml. of benzene, and the resulting solution is refluxed in a Dean-Stark apparatus until the evolution of water ceases. The reaction mixture is then cooled, washed with aqueous sodium bicarbonate, and dried with sodium sulfate. Upon fractional distillation of the solvent, pure N-(3-pentylidene)-cyclohexylamine is obtained. The latter compound (25 mmoles) is dissolved in 20 ml. of ether, and the resulting solution is added with stirring to a solution of lithium diisopropylamide (25 mmoles) in 50 ml. of ether at 0° C. The resulting solution is aged for 10 minutes at 0° C., after which the solution is cooled to —70° C. A solution of dimethylformylphosphonate (25 mmoles) in 25 ml. of ether is added dropwise to the solution of 3-oxo-2-pentyl-lithium at —70° C. The reaction mixture is aged for 24 hours at room temperature, after which it is cooled to 0° C., decomposed with ice water, and washed with dilute aqueous phosphoric acid. The ether layer is then washed with dilute aqueous sodium bicarbonate and dried with sodium sulfate. Upon evaporation of the solvent, dimethyl-(1-hydroxy-2-methyl - 3 - oxopentyl)-phosphonate is obtained.

When in the above procedure dibenzylformylphosphonate and diphenylformylphosphonate are employed in place of dimethylformylphosphonate, there are obtained dibenzyl-(1-hydroxy - 2 - methyl-3-oxopentyl)-phosphonate and diphenyl - (1 - hydroxy-2-methyl-3-oxopentyl)-phosphonate, respectively.

(E) Dimethyl - (1-hydroxy-3-hydroxyimino-2-methylpentyl)-phosphonate.—Dimethyl - (1-hydroxy-2-methyl-3-oxopentyl)-phosphonate (35 mmoles), hydroxylamine hydrochloride (0.25 mole), sodium hydroxide (0.25 mole), 140 ml. of water, and 10 ml. of ethanol are heated together with stirring at 60°–80° C. for 4–5 hours. The solvent is then removed in vacuo, and the crystalline residue is recrystallized from benzene-petroleum ether to yield dimethyl - (1 - hydroxy-3-hydroxyimino-2-methylpentyl)-phosphonate.

When in the above procedure dipropyl-(1-hydroxy-2-methyl-3-oxopentyl)-phosphonate and di-t-butyl-(1 - hydroxy-2-methyl-3-oxopentyl)-phosphonate are employed in place of dimethyl-(1-hydroxy-2-methyl-3-oxopentyl)-phosphonate, there are obtained dipropyl-(1-hydroxy-3-hydroxyimino - 2 - methylpentyl)-phosphonate and di-t-butyl-(1 - hydroxy-3-hydroxyimino-2-methylpentyl)-phosphonate, respectively.

When in the above procedure diallyl-[1-(1-hydroxyethyl)-2-oxopropyl]-phosphonate and diphenyl-[1-(1-hydroxyethyl)-2-oxobutyl]-phosphonate are employed in place of dimethyl-(1-hydroxy - 2 - methyl-3-oxopentyl)-phosphonate, there are obtained diallyl-[1-(1 - hydroxyethyl)-2-(hydroxyimino)-propyl] - phosphonate and diphenyl-[1-(1-hydroxyethyl) - 2 - hydroxyimino)-butyl]-phosphonate, respectively.

(F) Dimethyl-[1 - hydroxy - 2 - methyl-3-(tosyloxyimino)-pentyl]-phosphonate.—Dimethyl-(1 - hydroxy - 3-hydroxyimino - 2 - methylpentyl)-phosphonate (10 mmoles) is dissolved in 50 ml. of dry benzene, and the resulting solution is treated with 40 mmoles of washed sodium hydride first at room temperature and then at reflux for one hour. The mixture is then cooled to —5° C., and 10 mmoles of p-toluene sulfonyl chloride are added dropwise. The reaction mixture is stirred for 2 hours at 0° C., after which the mixture is filtered using Supercel as a filter aid; the filter cake is then washed with benzene. Upon evaporation of the solvent, crystalline dimethyl-[1-hydroxy - 2 - methyl - 3 - (tosyloxyimino)-pentyl]-phosphonate is obtained.

When in the above procedure dibenzyl-(1-hydroxy-3-hydroxyimino-2-methylpentyl)-phosphonate, dipropargyl-(1-hydroxy-3-hydroxyimino - 2 - methylpentyl)-phosphonate, and di-t-butyl-(1-hydroxy-3-hydroxyimino-2-methylpentyl-phosphonate are employed in place of dimethyl-(1-hydroxy-3-hydroxyimino - 2 - methylpentyl)-phosphonate, there are obtained dibenzyl-[1-hydroxy-2-methyl-3-(tosyloxyimino)-pentyl]-phosphonate, dipropargyl - [1 - hydroxy-2-methyl - 3 - (tosyloxyimino)-pentyl]-phosphonate and di-t-butyl-[1-hydroxy-2-methyl - 3 - (tosyloxyimino)-pentyl]-phosphonate, respectively.

When in the above procedure dibenzyl-[1-(1-hydroxyethyl)-2-(hydroxyimino)-propyl]-phosphonate, diphenyl-[1-(1-hydroxyethyl) - 2 - hydroxyimino)-butyl]-phosphonate, and dibutyl-[1 - (1 - hydroxy)-2-hydroxyimino)-butyl]-phosphonate are employed in place of dimethyl-(1-hydroxy-3-hydroxyimino - 2 - methylpentyl)-phosphonate, there are obtained dibenzyl-[1-(1-hydroxyethyl)-2-(tosyloxyimino)-propyl]-phosphonate, diphenyl-[1 - (1 - hydroxyethyl) - 2 - (tosyloxyimino)-propyl]-phosphonate, and dibutyl-[1-(1-hydroxyethyl) - 2 - (tosyloxyimino)-propyl]-phosphonate, respectively.

It should be understood that although this invention has been described with reference to particular embodiments thereof, changes and modifications may be made which are within its intended scope, and it should be limited only by the language of the appended claims.

What is claimed is:

1. A compound of the formula:

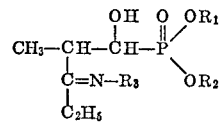

wherein $R_1$ and $R_2$ are the same or different and are selected from lower alkyl, mononuclear aryl, substituted mononuclear aryl wherein the substituent is halo, lower alkoxy or lower alkyl, mononuclear aralkyl, substituted mononuclear aralkyl wherein the substituent is halo, nitro, hydroxy or lower alkoxy, lower alkynyl and lower alkenyl; and $R_3$ is hydroxy, tosyloxy, brosyloxy, mesyloxy, trifluoroacetoxy, or 2,4-dinitrophenoxy group.

2. The compound of claim 1 wherein $R_1$ and $R_2$ are lower alkyl, and $R_3$ is tosyloxy.

3. The compound of claim 1 wherein $R_1$ and $R_2$ are lower alkyl and $R_3$ is —OH.

4. A compound of the formula:

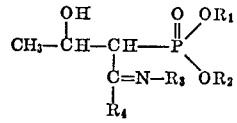

wherein $R_1$ and $R_2$ are the same or different lower alkyl, mononuclear aryl, substituted mononuclear aryl wherein the substituent is halo, lower alkoxy or lower alkyl; mononuclear aralkyl, substituted mononuclear aralkyl wherein the substitutent is halo, nitro, hydroxy or lower alkoxy lower alkynyl and lower alkenyl; $R_3$ is hydroxy tosyloxy, brosyloxy, mesyloxy, trifluoroacetoxy or 2,4-dinitrophenoxy group; and $R_4$ is lower alkyl, mononuclear aryl, substituted mononuclear aryl wherein the substituent is halo, nitro, or lower alkyl, mononuclear aralkyl, substituted mononuclear aralkyl wherein the substituent is halo, nitro or lower alkoxy, pyrrolyl, pyrryl, piperidyl, thiazolyl, furyl or pyrazinyl.

5. The compound of claim 4 wherein $R_1$ and $R_2$ are lower alkyl, $R_3$ is tosyloxy, and $R_4$ is loweralkyl.

References Cited

UNITED STATES PATENTS 3,597,508   8/1971   Richter et al. _____ 260—944

ANTON H. SUTTO, Primary Examiner

U.S. Cl. X.R.

260—348 R, 946, 968; 424—200, 203